Aug. 12, 1930.    J. J. VIENNEAU    1,773,068
ELECTRIC WELDING
Filed Aug. 8, 1927

Inventor
Jacob J. Vienneau,
by
His Attorney.

Patented Aug. 12, 1930

1,773,068

UNITED STATES PATENT OFFICE

JACOB J. VIENNEAU, OF PITTSFIELD, MASSACHUSETTS, ASSIGNOR TO GENERAL ELECTRIC COMPANY, A CORPORATION OF NEW YORK

ELECTRIC WELDING

Application filed August 8, 1927. Serial No. 211,358.

My invention relates to an improved joint and an improved joint and an improved method of joining two sheets of material through the application of heat and pressure. More particularly my invention relates to an improved method and apparatus for producing a line or seam weld between metallic plates.

For certain classes of work it is highly desirable to unite two sheets of metal without increasing the thickness of the resulting sheet at the joint. Such is the case in the manufacture of iron cores for electrical apparatus where in order to reduce the amount of material wasted at the ends of the sheets used for core punchings these sheets are joined previously to the punching operation so as to form an indefinitely long strip. If these sheets are joined by a lap weld the increased thickness at the point of welding gives a poor space factor in the cores formed from the punchings including these joints. If, however, the sheets from which the core laminations are punched are edge-welded it is possible to secure a better space factor in the cores and avoid the heavy waste which results from using a lapped joint, having a double thickness at the weld.

If the straight line edges of two sheets are butted against each other and welded by passing a welding electrode along the joint, the seam will tend to open up during the welding operation if the sheets are not securely clamped in place, and if the sheets are securely clamped in place they will tend to buckle along the joint. Furthermore, unless the edges of the sheets are upset previous to the welding operation the thickness of the resulting strip at the joint between the sheets will be materially less than the thickness of the sheets.

According to my invention I eliminate these difficulties by providing the abutting edges of the sheets to be joined with matched teeth and applying heat and pressure progressively along a zone common to both sheets and wide enough to include the teeth of each sheet to effect the joining of the sheets. By resorting to this practice I am enabled to secure a strong joint between the parts, eliminate the tendency of the seam to open during welding and prevent the sheets from necking in at the point of welding. My invention is particularly advantageous for joints between thin metal sheets or the like.

My invention will be better understood from the following description when considered in connection with the accompanying drawing and its scope will be pointed out in the appended claims.

Figure 1:
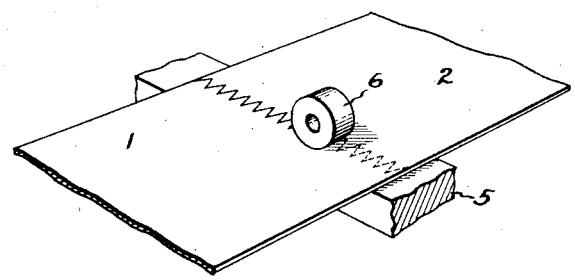
Figure 2:
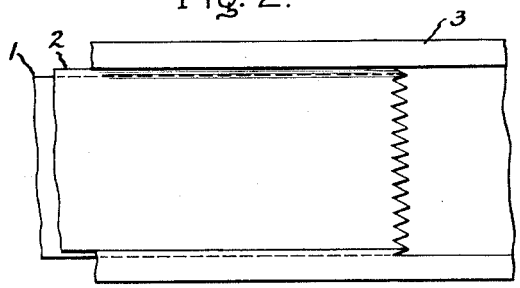
Figure 3:
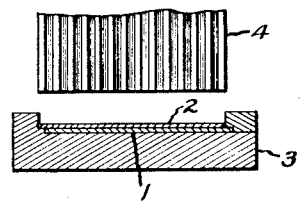

In Fig. 1, I have diagrammatically illustrated a method of performing the welding operation according to my invention. Figs. 2 and 3 show suitable apparatus for preparing the edges of two sheets with matched teeth such as shown in Fig. 4 and Figs. 5, 6 and 7 show other representative forms of matched teeth. Fig. 8 shows the manner of joining sheets that have an insulating scale or covering on one surface in order to secure a satisfactory weld.

One method of securing matched teeth in the sheet edges previous to the welding operation is shown in Figs. 2 and 3. As shown in these figures, two sheets 1 and 2 are inserted into a die member 3 where they are laterally displaced relative to each other half the width of a tooth for a purpose that will presently appear. While held in this position the complementary die member 4 is brought down on the sheets 1 and 2 cutting a plurality of teeth in the sheets as shown in Fig. 2. The sheets 1 and 2 are then removed from the die 3 and placed end to end as in Fig. 4. By reason of the offsetting previously resorted to the edges of the sheets will match as shown in Fig. 4 and the teeth will match perfectly.

Figure 4:
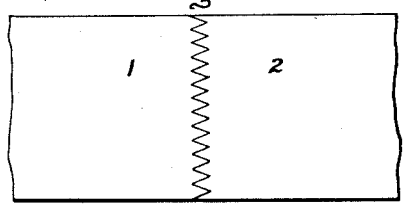

With the sheets in the assembled position of Fig. 4 a resistance line welding operation is performed as illustrated in Fig. 1. Resistance line welding, as is well known in the art, is a form of resistance welding in which two surfaces are welded together under pressure progressively along a continuous line of contact. In resistance welding the heat necessary to bring the surfaces to be welded to a temperature suitable to secure a union between the parts is produced by a flow of electric current through the parts to be welded. This current is applied to the work parts through electrodes which may also be used to apply the necessary pressure. The apparatus diagrammatically illustrated in Fig. 1 comprises a fixed electrode 5 and a movable electrode 6 although it is apparent that a plurality of movable electrodes may be used or that the work may be moved relatively to a plurality of fixed electrodes. Whether the electrode 5 moves relatively to sheets 1 and 2 or vice versa the arrangement is such that the electrode covers the width of the match tooth joint and is moved transversely along the joint across the matched teeth. By reason of the matched teeth the seam will not open up during welding for one plate cannot slide away from the other due to the meshed teeth. In fact the parts are forced together along the edges of the teeth.

Figure 5:
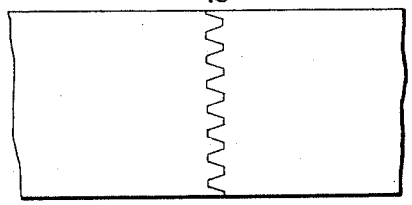
Figure 6:
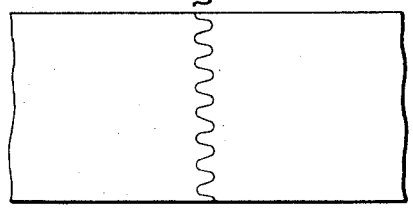
Figure 7:
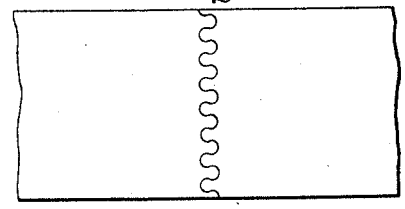
Figure 8:
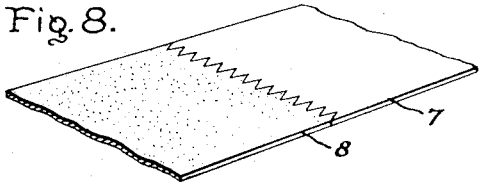

The forms of matched teeth may be varied in numerous ways and in Figs. 5, 6 and 7 I have shown several modifications. In Fig. 5 the tips of the triangular teeth of Fig. 4 have been cut off, in Fig. 6 a rounded tooth is shown and in Fig. 7 I have illustrated a rounded interlocking tooth. By interlocking the teeth as in Fig. 7 the weld metal is relieved of some of the stresses set up in the sheet at the joint.

Sheet plate is often rolled in packs of from five to ten sheets. During the rolling operation the outside surfaces of the two outside sheets acquire a coating of scale that is of high resistance and effectively opposes the flow of welding current. In welding sheets having this scale surface care must be taken not to have the two sheets that are to be joined placed in the welding machine with the scale surfaces of both sheets presented to the same electrode. By joining the sheets in such a manner that the upper side of one sheet that is scaled is placed next to a sheet where upper surface is free of scale as shown in Fig. 8, welding current from an electrode engaging the upper surfaces of the sheets may effectively pass from sheet 7 whose surface is unscaled through the joint to an electrode engaging the under surfaces of the sheets and the scale free surface of sheet 8. In this way a good weld may be secured. Of course, if both sides of a sheet are scale covered it is necessary to clean at least one side of the sheet at the welding edge as by grinding or sandblasting before the welding operation is performed.

It will be apparent to those skilled in the art that modifications may be made in the particular arrangements disclosed without departing from my invention and I therefore aim in the appended claims to cover all such changes and variations as fall within the true spirit and scope of my invention.

What I claim as new and desire to secure by Letters Patent of the United States, is:

1. The method of joining two sheets of material which comprises cutting matched teeth in the abutting edges of the sheets, placing the toothed edges of the sheets together with the teeth in mesh to form a joint and uniting the sheets by applying heat and pressure progressively along a zone common to both sheets and wide enough to include the teeth of each sheet to press the edge portions of the teeth of one sheet into and integrally unite them with the edge portions of the teeth of the other sheet.

2. The method of resistance line welding which comprises cutting matched teeth in the abutting edges of two sheets, placing the sheets together with the teeth in mesh to form a joint, and welding the sheets together by applying current and pressure progressively along a zone including the joint between the sheets wide enough to include the teeth of both sheets.

3. The method of resistance line welding which comprises cutting a plurality of interlocking teeth in the abutting edges of two sheets, joining the sheets by interlocking the teeth thus provided and welding the sheets together by applying pressure and current progressively along a zone common to the sheets and wide enough to include the teeth of each sheet.

4. The method of resistance line welding two metal sheets which comprises providing the abutting ends of the sheets with matched teeth, placing the sheets together with the teeth in mesh to form a joint, and welding the sheets together along the edges of the teeth by passing an electrode through which current and pressure are applied to the sheets tranversely to the teeth formed in each sheet.

5. The method of electrically welding metallic sheeting which consists in providing an end of each sheet with matched teeth, placing the toothed edges of the sheets together with the teeth in mesh to form a joint, and applying pressure and welding current progressively along a zone common to both sheets and wide enough to include the teeth of each sheet.

6. The method of resistance line welding sheets having an insulating coating on one surface only which comprises cutting matched teeth in the abutting edges of the two sheets, placing the sheets together with the teeth in mesh and with their coated and uncoated surfaces in juxtaposition, and passing a welding current across the joint between the sheets from the uncoated surface of one sheet to the uncoated surface of the other sheet.

7. The method of resistance line welding sheets having an insulating coating on one surface only which comprises assembling the sheets with their coated and uncoated surfaces in juxtaposition and passing a welding current across the joint between the sheets from the uncoated surface of one sheet to the uncoated surface of the other sheet.

In witness whereof, I have hereunto set my hand this 1st day of August, 1927.

JACOB J. VIENNEAU.